United States Patent
Kim

(10) Patent No.: US 9,919,205 B2
(45) Date of Patent: Mar. 20, 2018

(54) METHOD OF APPLYING MULTIPLE CROSSHAIRS AND RECORDING MEDIUM HAVING STORED THEREON PROGRAM FOR EXECUTING THE SAME

(71) Applicant: Sin Woo Kim, Daejeon (KR)

(72) Inventor: Sin Woo Kim, Daejeon (KR)

( * ) Notice: Subject to any disclaimer, the term of this patent is extended or adjusted under 35 U.S.C. 154(b) by 294 days.

(21) Appl. No.: 14/039,230

(22) Filed: Sep. 27, 2013

(65) Prior Publication Data

US 2014/0342788 A1   Nov. 20, 2014

(30) Foreign Application Priority Data

May 15, 2013   (KR) .................. 10-2013-0054954

(51) Int. Cl.
| | | |
|---|---|---|
| *A63F 9/24* | (2006.01) | |
| *A63F 13/00* | (2014.01) | |
| *G06F 17/00* | (2006.01) | |
| *G06F 19/00* | (2011.01) | |
| *A63F 13/40* | (2014.01) | |

(52) U.S. Cl.
CPC ............ *A63F 13/005* (2013.01); *A63F 13/10* (2013.01); *A63F 2300/306* (2013.01); *A63F 2300/8076* (2013.01)

(58) Field of Classification Search
CPC ............ A63F 2300/8076; A63F 13/005; A63F 13/10; A63F 2300/306
USPC ........................................................ 463/2
See application file for complete search history.

(56) References Cited

U.S. PATENT DOCUMENTS

| | | | |
|---|---|---|---|
| 5,880,709 A | 3/1999 | Itai et al. | |
| 6,556,204 B1 | 4/2003 | Itai et al. | |
| 2002/0077165 A1* | 6/2002 | Bansemer | A63F 9/0291 463/7 |
| 2003/0199325 A1 | 10/2003 | Wang | |
| 2007/0265072 A1* | 11/2007 | Matsuda | A63F 13/10 463/35 |
| 2009/0181736 A1 | 7/2009 | Haigh-Hutchinson | |
| 2009/0325660 A1* | 12/2009 | Langridge | A63F 13/10 463/2 |

FOREIGN PATENT DOCUMENTS

| | | |
|---|---|---|
| EP | 0700010 A2 | 3/1996 |
| JP | 2004129960 | 4/2004 |

OTHER PUBLICATIONS

KAI multi sniping targeting location, http://www.inven.co.kr/board/powerbbs.php?come_idx=2028&l=20773, Mar. 19, 2012.
New Crosshair news—Avarice Game, Feb. 24, 2013, http://www.moddb.com/games/avarice/news/new-crosshair, 5 pages.

* cited by examiner

*Primary Examiner* — Omkar Deodhar
*Assistant Examiner* — Wei Lee
(74) *Attorney, Agent, or Firm* — The Webb Law Firm

(57) ABSTRACT

Provided is a method of applying multiple crosshairs, and more particularly, a method of applying multiple crosshairs in a shooting game, in which a background and a target are displayed on a screen by a user's operation and crosshairs are displayed on the screen. The method comprises displaying multiple crosshairs on the screen, and upon receiving a shooting instruction, shooting a projectile toward the crosshairs.

11 Claims, 16 Drawing Sheets

METHOD OF APPLYING MULTIPLE CROSSHAIRS AND RECORDING MEDIUM HAVING STORED THEREON PROGRAM FOR EXECUTING THE SAME

CROSS-REFERENCE TO RELATED APPLICATIONS

This application claims priority under 35 U.S.C. § 119 to Korean Patent Application No. 10-2013-0054954, filed on May 15, 2013, in the Korean Intellectual Property Office, the disclosure of which is incorporated herein by reference in its entirety.

TECHNICAL FIELD

The following disclosure relates to a method of applying multiple crosshairs, and in particular, to a method of applying multiple crosshairs in a shooting game.

BACKGROUND

Recently, video game industries have rapidly developed as computer-related information and communication technologies evolve. In particular, high-speed Internet connections have opened a new field of video game, i.e., multi-user on-line games, which resulted in game industries drastically evolved.

On-line games are popular since people in distant locations may play games without being spatially limited. Among others, shooting games in which users attack targets in a virtual 3D space are especially popular since they help relieve users' stress and also provide various images and sound effects.

In early shooting games, air ships appeared on a 2-dimensional plane, and the games were mainly arcade games.

As the performance of computers have evolved, shooting games have also evolved such that game can be represented in 3-dimensional space, which correspondingly produced a new genre of a shooting game wherein a first person shooter (FPS) has been developed, in which combats are carried out using weapons in a user' view point, i.e., first person view point.

In the latest video shooting games, various weapon items such as missiles, bombs, guns, knives are displayed, and users combat with opponents while riding on air planes, helicopters, tanks and the like, such that the games become more and more difficult.

As the video shooting games become difficult, users may feel difficulty in playing the games.

In addition, in existing game systems with one crosshair, users need to move by the amount according to a monitor resolution to hit a target so that the users may become easily fatigued. Further, when one user faces multiple opponents, it is hard for the user to turn the tables, making the game less interesting even before it is over. Moreover, it is very hard for beginners to play against high level players since there are differences in their ability.

US Patent Laid-Open Publication No. 2003/0199325 discloses that crosshair is differently displayed depending on the possibility to hit an object appearing on a game screen.

PRIOR ART DOCUMENT

Patent Document

US Patent Laid-Open Publication No. 2003/0199325

SUMMARY

An embodiment of the present invention is directed to providing a method of applying multiple crosshairs to enable a user to aim at a target more easily such that a game becomes speedy and thereby more exciting and compelling.

In addition, by using multiple crosshairs, a user feels less fatigue and a user in crisis may have a chance to turn the tables with multiple shots. Further, the life cycle of a game can be elongated by providing excitement due to a speedy game progress and by allowing a user to determine patterns of several crosshairs.

In addition, using multiple crosshairs makes a game easier than using one crosshair, thereby enticing new subscribers.

Moreover, convenience of a game can be improved so that a user plays the game more conveniently and entertainingly.

In one general aspect, there is provided a method of applying multiple crosshairs, in which a background and a target 30 is displayed on a screen 100 by a user's operation and crosshairs 10 are displayed on the screen 100, including: displaying multiple crosshairs 10 on the screen 100 (S10); and upon receiving a shooting instruction, shooting a projectile 40 toward the crosshairs 10 (S90).

The method (S100) may further include, prior to the shooting (S90), designating a shooting instruction to shoot toward one crosshair 10 or two or more crosshairs 10 (S80), wherein the shooting (S90) is conducted according to the shooting instruction designated in the designating of the shooting instruction (S80).

In the shooting (S90), shooting may be conducted for all of the crosshairs simultaneously according to a predetermined shooting command.

In the shooting (S90), the number of the projectiles 40 may be reduced by the number of launched projectiles 40.

The method (S100) may further include, after the displaying of the crosshairs (S10), changing the number of crosshairs 10 by adding or deleting the crosshairs 10.

The method (S100) may further include, after the displaying of the crosshairs (S10), designating the locations of the crosshairs 10 (S30).

The method (S100) may further include, after the displaying of the crosshairs (S10), adjusting the locations of the multiple crosshairs 10 upon receiving a predetermined crosshair adjust instruction (S50).

The method (S100) may further include, before the adjusting of the locations of the crosshairs (S10), designating the crosshair adjust instruction (S40).

The method (S100) may further include, before the adjusting of the crosshairs (S50), designating a location of a reference point 11 (S35), wherein the adjusting of the crosshairs (S50) adjusts the locations of the multiple crosshairs 10 with reference to the reference point.

The method (S100) may further include, after the displaying of the crosshairs (S10), inputting a pattern of crosshairs according to successive shooting (S60).

The method (S100) may further include, after the inputting of the pattern (S60), designating a pattern use instruction to use a pattern input in the inputting of the pattern S60 (S70).

The method (S100) may further include, before the shooting (S90), automatically tracing the target 30 by the crosshairs 10 if the target 30 passes over the crosshairs 10.

In another general aspect, there is provided a recording medium having stored thereon a program for executing the method of applying multiple crosshairs described above.

Other features and aspects will be apparent from the following detailed description, the drawings, and the claims.

[Detailed Description of Main Elements]

10: crosshairs                11: reference point
    20: weapon                    30: target
    40: projectile                100: screen
    S10: displaying crosshairs
    S20: changing the number of crosshairs
    S30: designating locations of crosshairs
    S35: designating location of reference point
    S40: designating crosshair adjust instruction
    S50: adjusting locations of crosshairs
    S60: inputting pattern
    S70: designating pattern use instruction
    S75: automatically tracing
    S80: designating shooting instruction
    S90: shooting
    S100: method of applying multiple crosshairs

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments will be described in detail with reference to the accompanying drawings.

Hereinafter, a method of applying multi crosshair according to an exemplary embodiment of the present invention will be described in detail with reference to the accompanying drawings.

Figure 11:
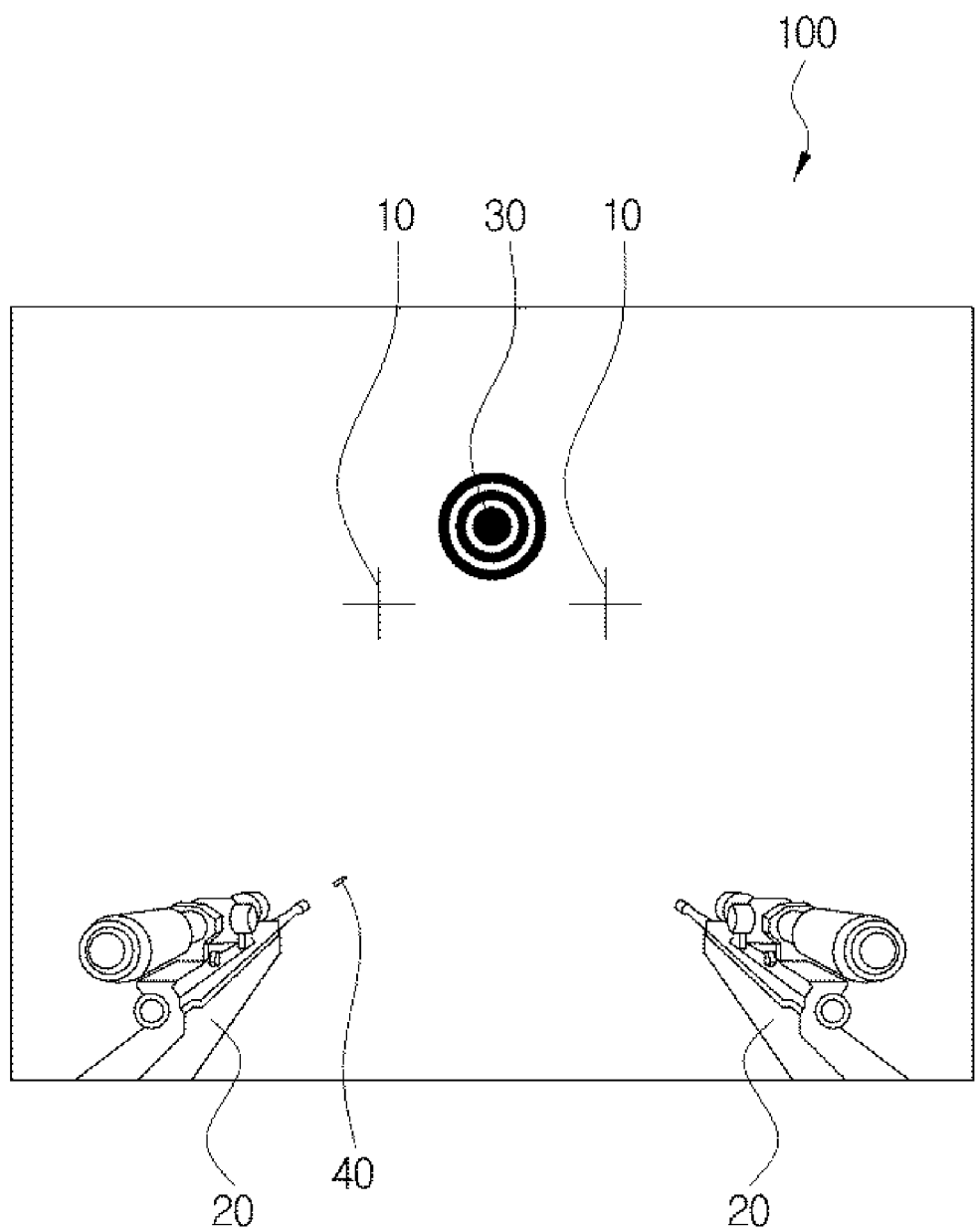
FIG. 11 shows an embodiment in which two weapons are used and two crosshairs are displayed.
Figure 12:
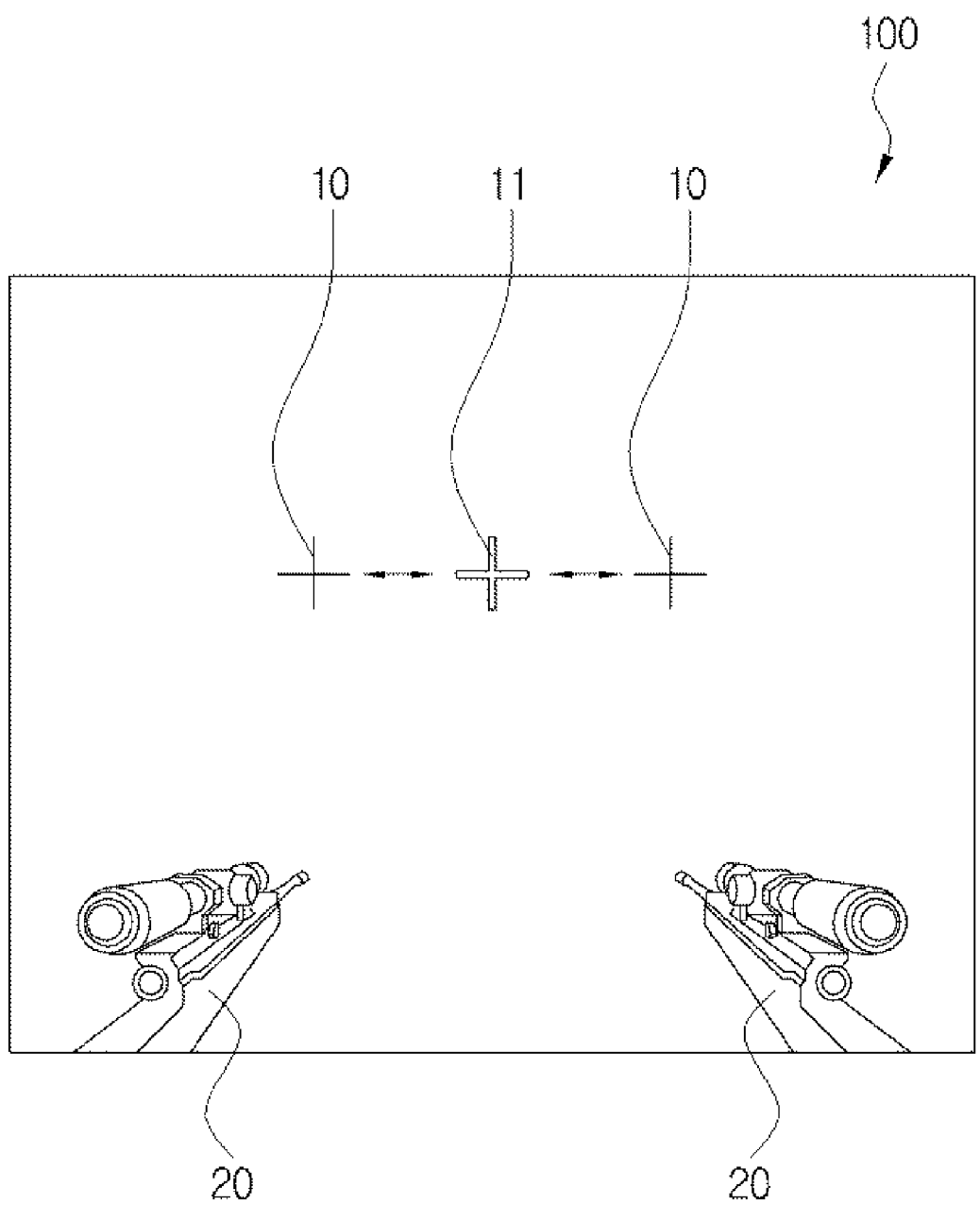
FIG. 12 shows an embodiment in which a reference point is applied to FIG. 11.
Figure 13:
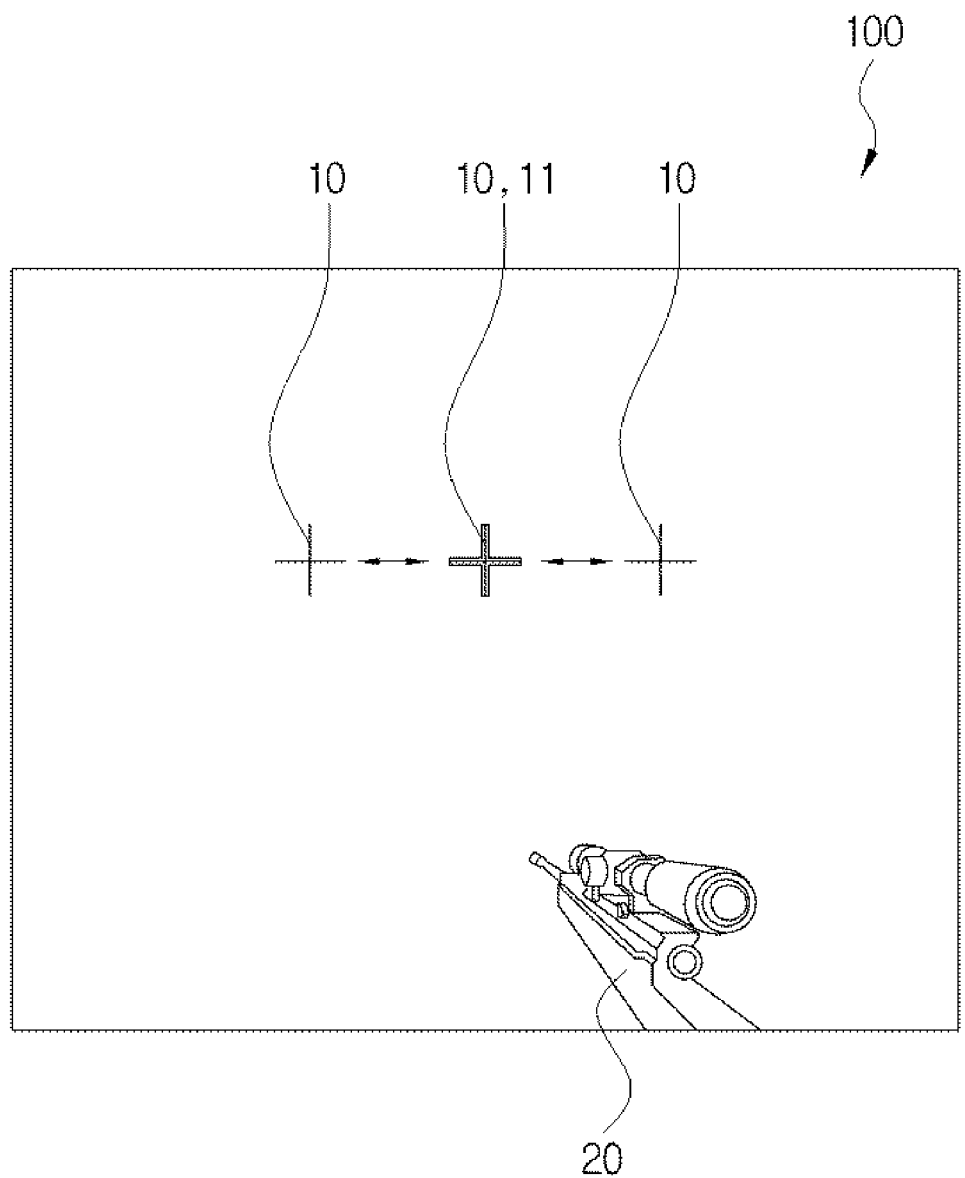
FIG. 13 shows an embodiment in which one weapon is used and three crosshairs are displayed.
Figure 14:
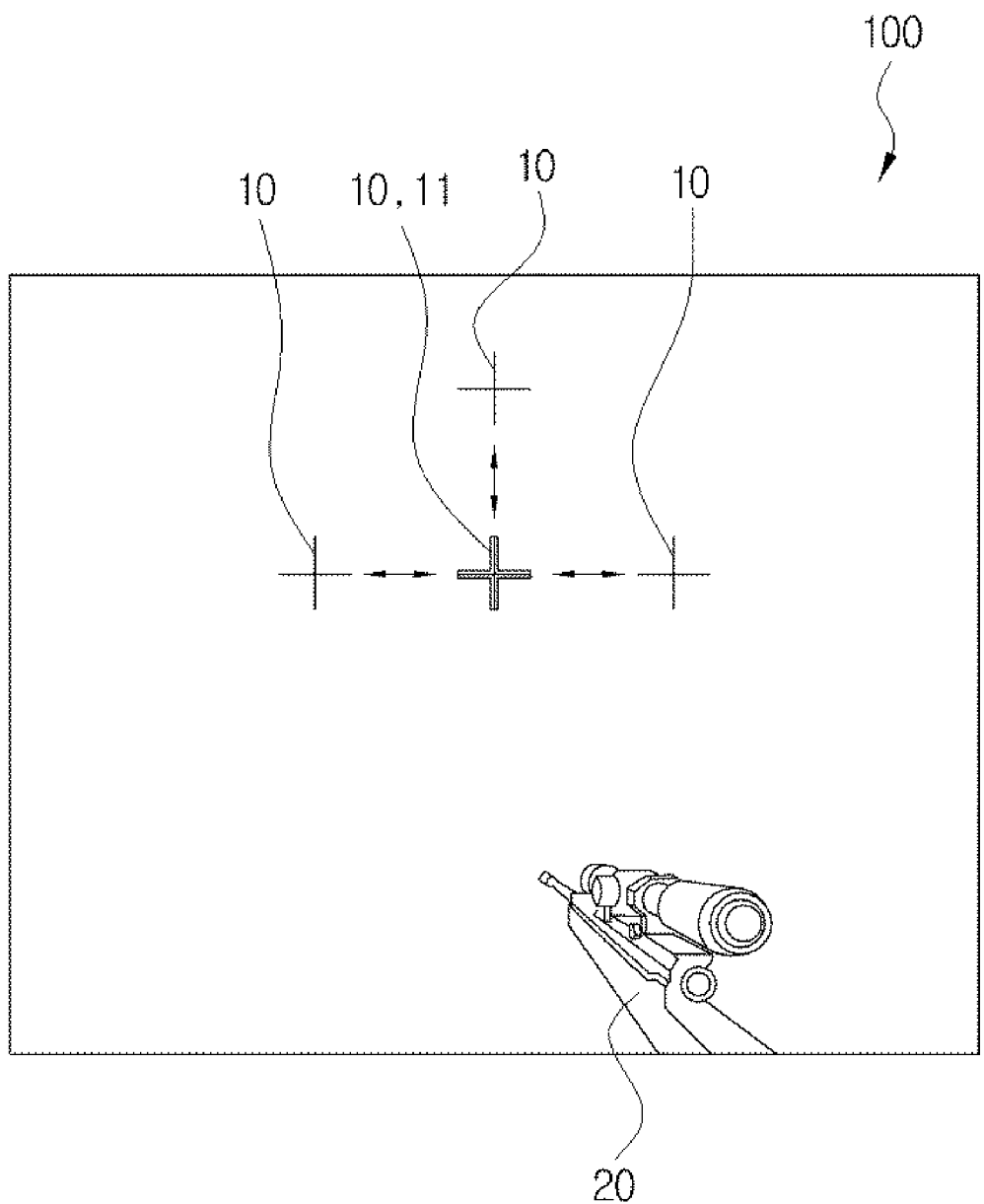
FIG. 14 shows an embodiment in which one weapon is used and four crosshairs are displayed.
Figure 15:
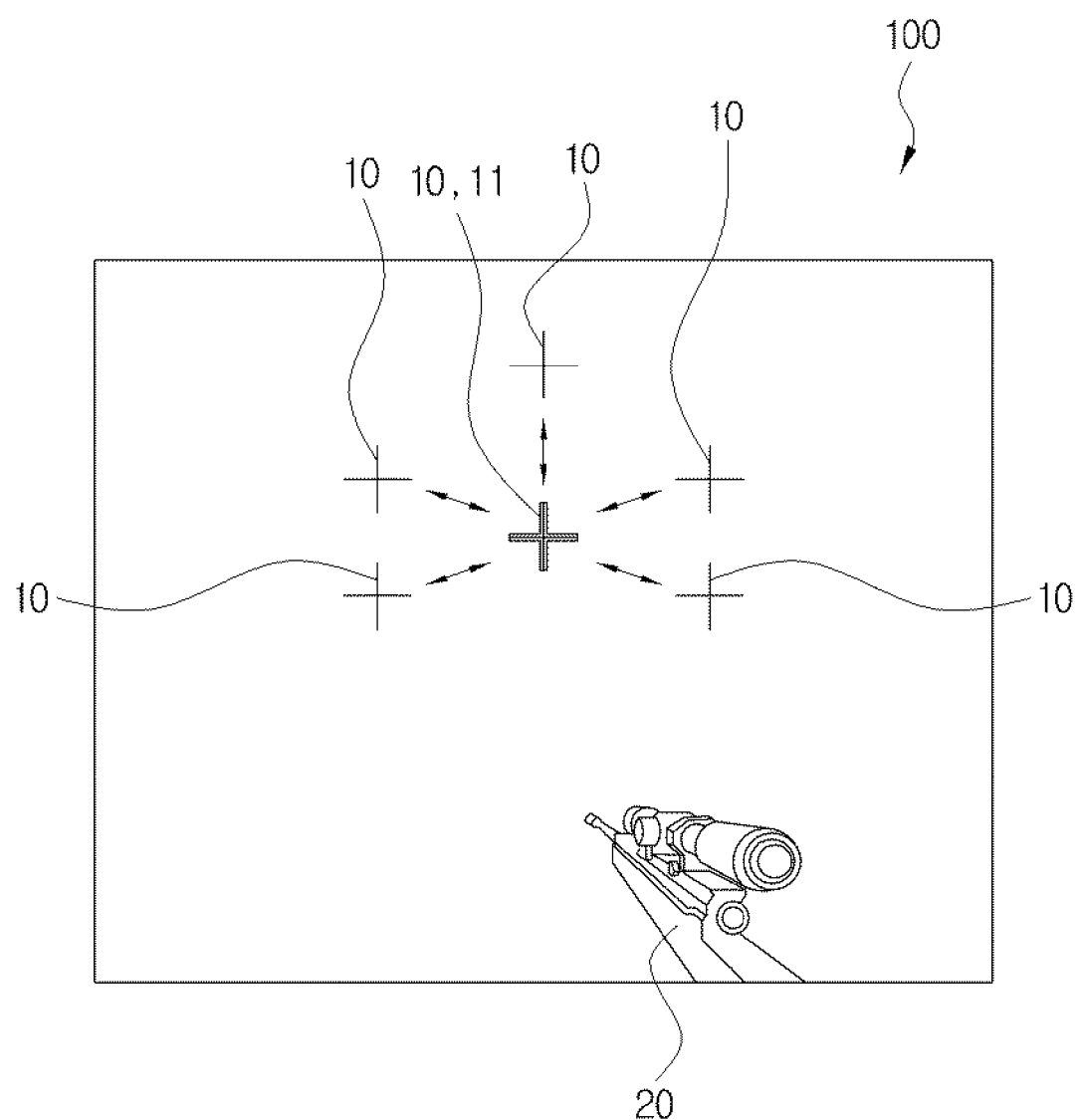
FIG. 15 shows an embodiment in which one weapon is used and six crosshairs are displayed.
Figure 16:
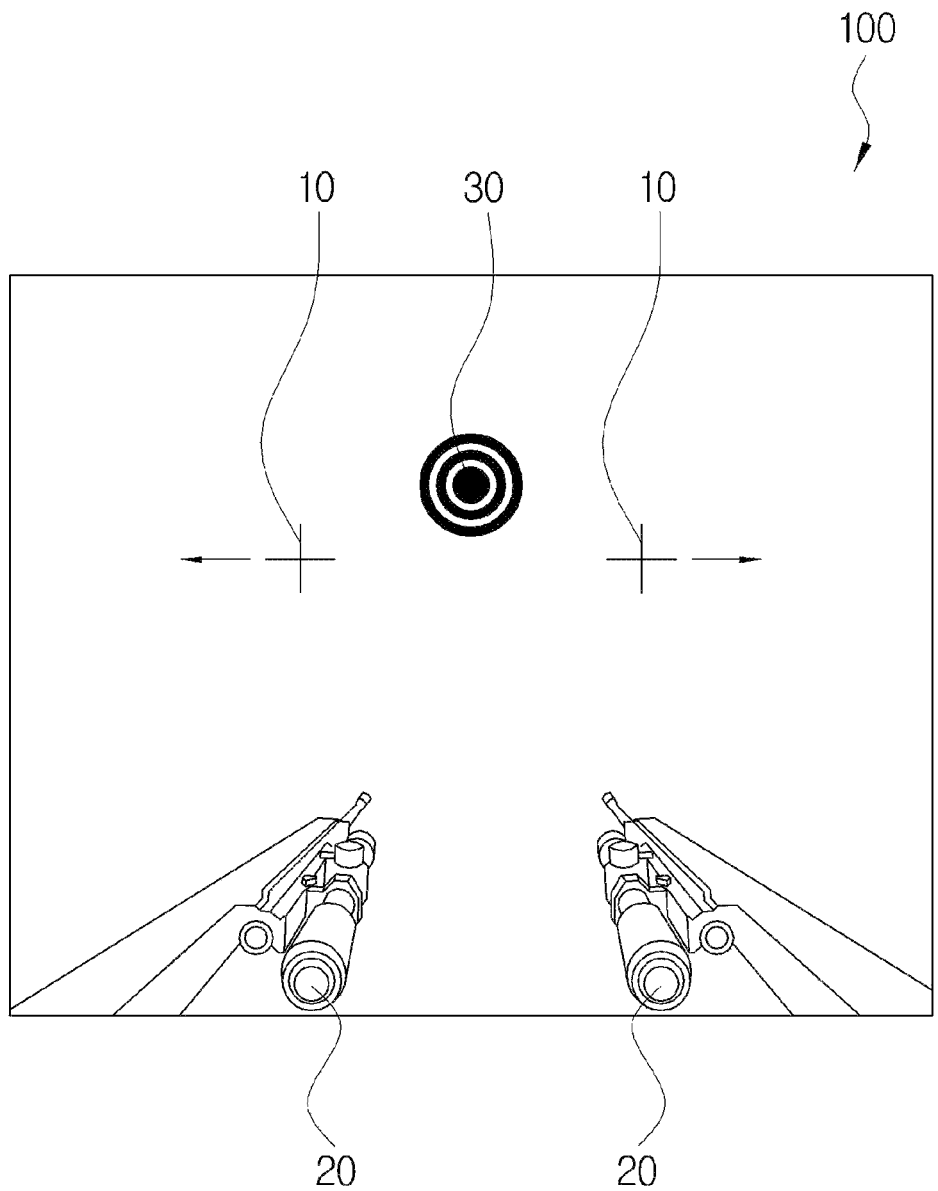
FIG. 16 shows an embodiment in which a pattern is applied to FIG. 11.

FIGS. 1 to 10 are flowcharts illustrating a method of applying multiple crosshairs according to an embodiment of the present invention; FIG. 11 shows an embodiment in which two weapons are used and two crosshairs are displayed; FIG. 12 shows an embodiment in which a reference point is applied to FIG. 11; FIG. 13 shows an embodiment in which one weapon is used and three crosshairs are displayed; FIG. 14 shows an embodiment in which one weapon is used and four crosshairs are displayed; FIG. 15 shows an embodiment in which one weapon is used and six crosshairs are displayed; and FIG. 16 shows an embodiment in which a pattern is applied to FIG. 11.

A first person shooter (FPS) is a type of shooting game in which a user combats with weapons in the user's view point, i.e., first person view point. In other words, it is a first person shooting game. In such games, the view point of a character and that of a user should be the same, and thus they are usually configured in 3D and require a more realistic view more than any other games.

Similar to this, there is a shooting game in which a character's back may be seen from third person view point. This is called as third-person shooting (TPS).

In general FPS games, view point of a character may be moved as a user desires. In addition, there is also a light gun shooter in which view point is fixed on a screen or is forcibly moved as a game progresses.

To be distinguished from monotonous military series, some FPS games are about fantasy FPS games using magic spells, SF FPS games using future weapons, and super power FPS games using upper powers. Further, a massively multiplayer online first person shooter (MMOFPS) games have been shown up in which a plurality of users accesses simultaneously and conduct large scale combat.

Figure 1:
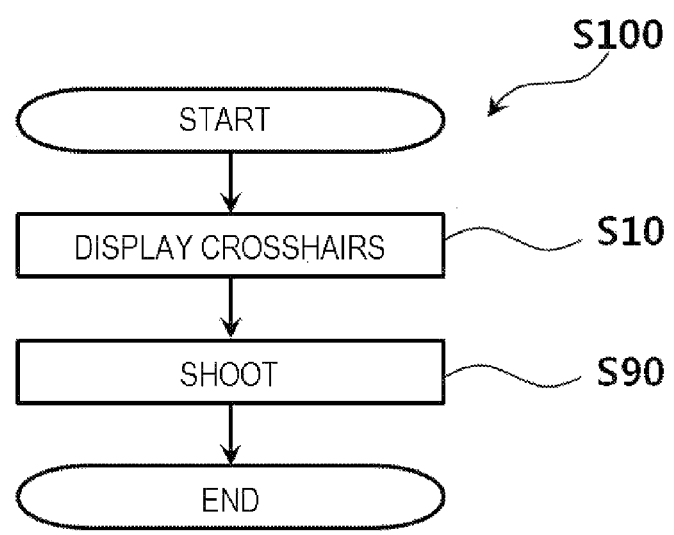
FIGS. 1 to 10 are flowcharts illustrating a method of applying multiple crosshairs according to an embodiment of the present invention.

As shown in FIGS. 1 and 11, in a method of applying multiple crosshairs according to an embodiment of the present invention (S100), a background and a target 30 are displayed on a screen 100 according to a character's operation. The method in which crosshairs 10 are presented on the screen 100 includes displaying cross hairs (S10) and shooting (S90).

In the displaying of the crosshair (S10), multiple crosshairs 10 are displayed on the screen 100. Here, a crosshair refers to a cross mark indicating a position where a projectile reaches in a video shooting game and typically is marked at the center of a screen or near the center with a predetermined distance apart therefrom.

For example, as shown in FIG. 11, assuming that the character is a person, in order to implement the function that one person carries two weapons 20 and shoots them simultaneously or separately, two crosshairs can make the game more realistic.

As another example, as shown in FIGS. 13 to 15, assuming that the character is a person, even when one person shoots with one weapon 20, multiple crosshairs 10 may be displayed for convenience of operation. Using multiple crosshairs 10 makes the distances from the crosshairs 10 to the target 30 shorter, thereby providing convenience of operation.

In conclusion, although one crosshair has been displayed previously, multiple crosshairs may be presented depending on the performance of a weapon or a user's preference. This enables a user to move multiple crosshairs with less operation to quickly aim at a target, compared to a game in which only one crosshair is displayed for aiming a target.

In the shooting (S90), upon receiving a shooting instruction, the projectiles 40 are launched toward the crosshairs 10.

Figure 2:
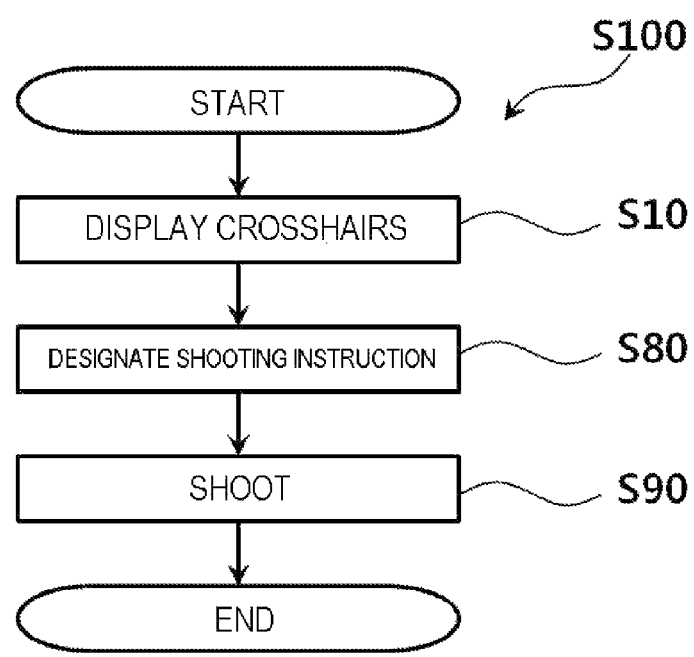

As shown in FIG. 2, the method (S100) of applying multiple crosshairs according to the embodiment of the present invention includes, prior to the shooting (S90), designating shooting instruction(s) toward one crosshair 10 or two or more crosshairs 10 (S80). The shooting (S90) may be conducted according to the shooting instructions designated in the designating of the shooting instructions (S80).

In other words, an individual shooting instruction may be designated for each of the crosshairs, or several shooting instructions for two or more crosshairs may be designated.

For example, as shown in FIG. 15 in which six crosshairs are displayed at the center, at the upper side, at the upper-left side, at the upper-right side, at the lower-left side, and at the lower-right side, a shooting instruction for the crosshair at the center may be designated as a first shooting instruction, a shooting instruction for the crosshair at the upper side may be designated as a second shooting instruction a shooting instruction for the crosshair at the upper-left side may be designated as a third shooting instruction, a shooting instruction for the crosshair at the upper-right side may be designated as a fourth shooting instruction, a shooting instruction for the crosshair at the lower-left side may be designated as a fifth shooting instruction, a shooting instruction for the crosshair at the lower-right side may be designated as a sixth shooting instruction.

In addition, a shooting instruction for the crosshairs at the upper side, at the upper-left side and at the upper-right side may be designated as a seventh shooting instruction, and a shooting instruction for the crosshairs at the lower-left side and at the lower-right side may be designated as an eighth shooting instruction.

Each of the shooting instructions may be designated using a keyboard, a mouse, a joystick, a touchpad, a touch screen or the like.

In the shooting (S90), shooting may be conducted for all of the crosshairs simultaneously according to a predetermined shooting instruction.

Namely, the number of projectiles 40 corresponding to the number of the crosshairs 10 may be launched toward respective crosshairs 10.

Here, one projectile may be launched for each of the crosshairs according to a shooting instruction. Further, two or more projectiles may be launched toward the respective crosshairs. Moreover, the number of projectiles 40 corresponding to the number of the entire crosshairs 10 may be launched toward respective crosshairs 10.

In the shooting (S90), the number of the projectiles 40 may be reduced by the number of launched projectiles 40.

In other words, when two or more projectiles 40 are launched toward two or more crosshairs 10, the number of the projectiles 40 may be reduced by the number of the launched projectiles 40.

Figure 3:
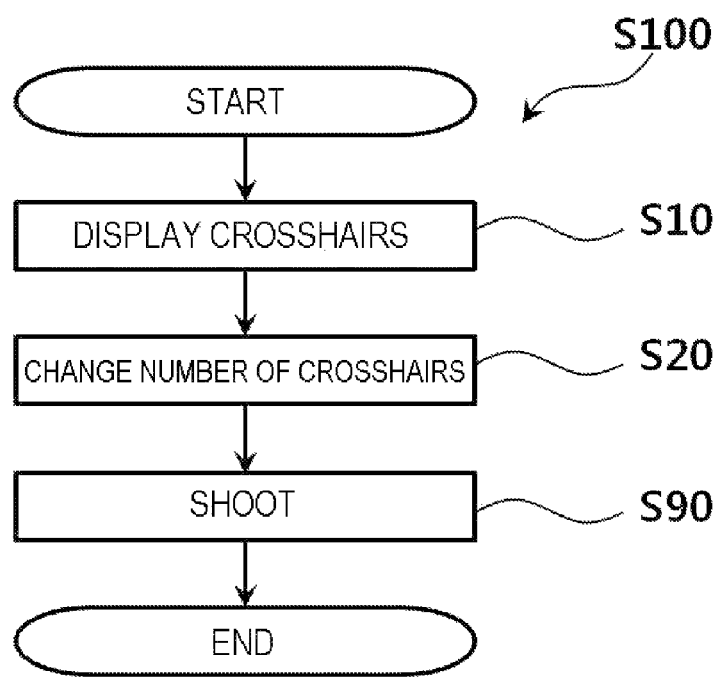

As shown in FIG. 3, the method of applying multiple crosshairs according to the embodiment (S100) may include, after the displaying of the crosshairs (S10), changing the number of crosshairs 10 by adding or deleting the crosshairs 10.

In other words, the number of the crosshairs 10 may be added or deleted as a user desires.

Limiting the number of the crosshair is preferable because, otherwise, it is possible to increase the number of the crosshairs 10 indefinitely so as to aim at all of the pixels and shoot them simultaneously, the game becomes less realistic and thus less compelling. In addition, it is also possible to give a penalty that a character becomes slower as the number of the crosshairs 10 increases.

Figure 4:
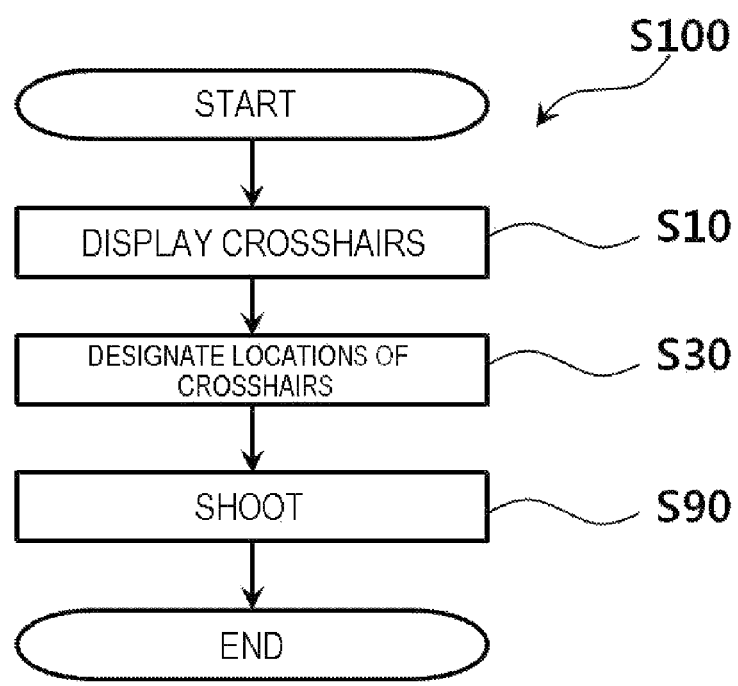

As shown in FIG. 4, the method of applying multiple crosshairs according to the embodiment (S100) may include, after the displaying of the crosshairs (S10), designating the locations of the crosshairs 10 (S30). In other words, the locations of the crosshairs 10 may be designated as a user desires.

For example, for the first person shooter who may move forward, backward, to the left and to the right, may sit down, may move forward, backward, to the left and to the right while sitting, may jump, and may move forward, backward, to the left and to the right while jumping, it is often that a target 30 (an opponent character) jumps or moves in order to avoid being targeted. Accordingly, in order to make targeting easier when a target jumps or moves to the left and right and to react quickly, as shown in FIG. 14, crosshairs 10 may be designated at the upper side, the left side and the right side of the crosshair 10 at the center. Accordingly, in order to make targeting easier when a target jumps, moves to the left and right while jumping, or move to the left and right while sitting, as shown in FIG. 15, crosshairs 10 may be designated at the upper side, the upper-left side and the upper-right side, the lower-left side and the lower-right side of the crosshair 10 at the center. As such, by designating the locations of the crosshairs 10 in advance according to the predicted trajectories of the target 30, it is possible to react more quickly. Here, the targeting refers to location of the crosshair 10 on the location of the target 30.

Figure 5:
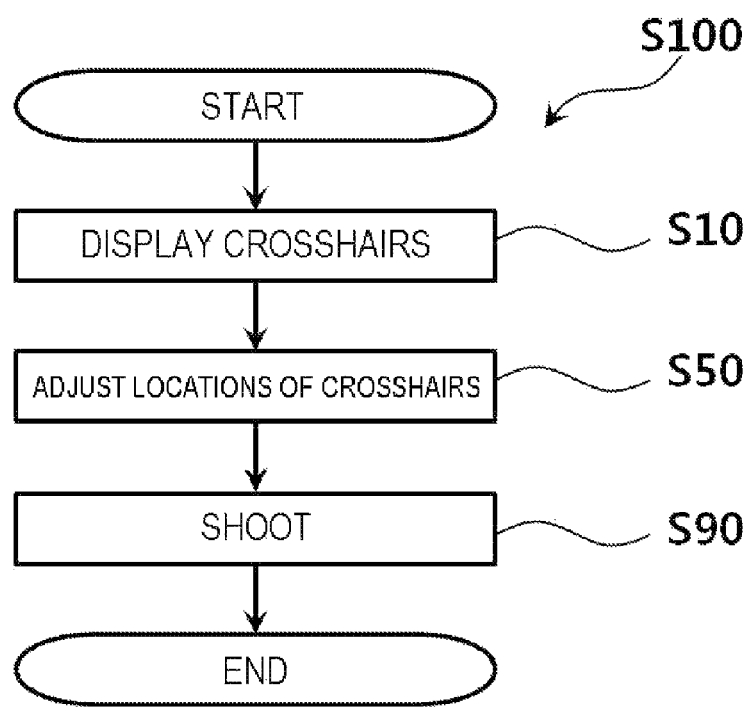

As shown in FIG. 5, the method of applying multiple crosshairs according to the embodiment (S100) may include, after the displaying of the crosshairs (S10), adjusting the locations of the multiple crosshairs 10 upon receiving a predetermined crosshair adjust instruction.

For example, as shown in FIGS. 12 to 15, the crosshair adjust instruction may adjust the distances among the crosshairs 10 and may include an instruction to widen the distances of the crosshairs from the center point of a screen (wide all) and an instruction to narrow the distances of the crosshairs to the center point of a screen (narrow all). This is to reflect the difference of the trajectories of the target 30 varying depending on the distance to the target 30, so as to make targeting easier.

Figure 6:
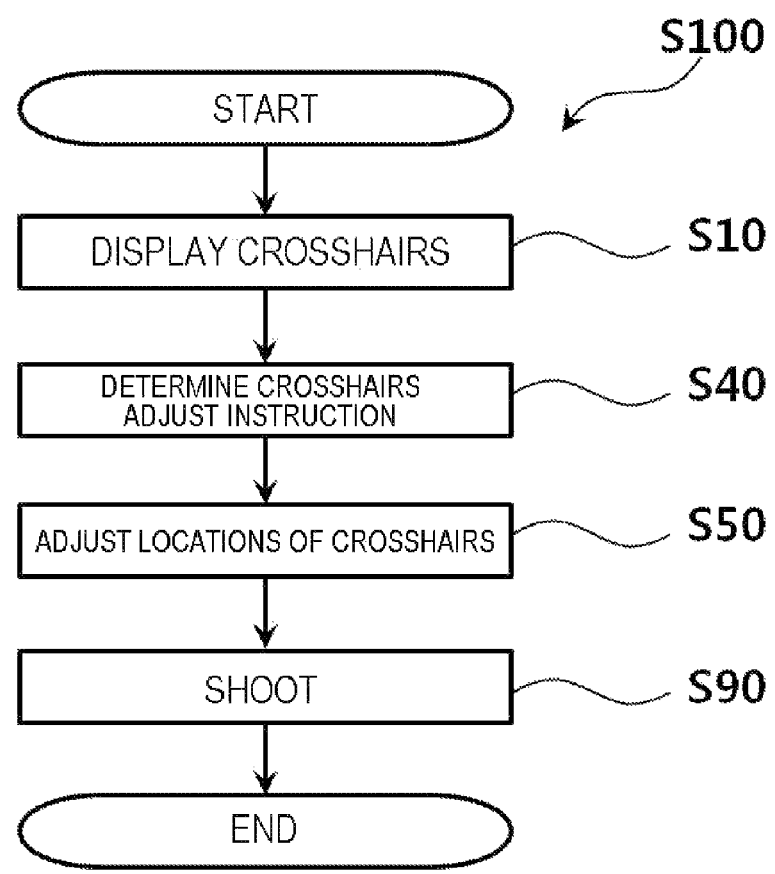

As shown in FIG. 6, the method of applying multiple crosshairs according to the embodiment (S100) may include, before the adjusting of the locations of the crosshairs (S50), designating the crosshair adjust instruction (S40).

In other words, the crosshair adjust instruction may be designated as a user desires.

For example, the instructions may include individual control instruction (wide first crosshair, narrow first crosshair, wide second crosshair, narrow second crosshair and the like), an instruction to widen all of the crosshairs 10 from the center of the screen (widen all), an instruction to narrow all of the crosshairs 10 to the center of the screen (narrow all), and each of the crosshair adjust instruction may be designated by a key board, a mouse, a joy stick, a touch pad, a touch screen and so on.

Although the crosshairs have been described to be moved with reference to the center point, the present invention is not limited thereto but the crosshairs may move to edges of the screen passing through the center point.

Figure 7:
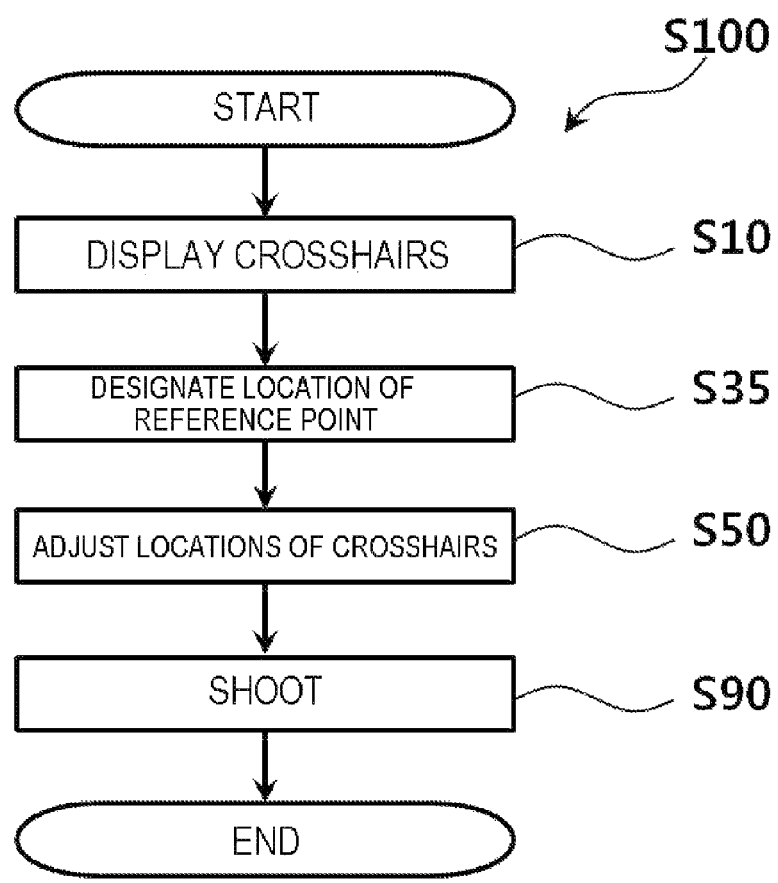

As shown in FIG. 7, the method of applying multiple crosshairs according to the embodiment (S100) may include, before the adjusting of the crosshairs (S50), designating the location of a reference location 11 (S35), and the adjusting of the crosshairs (S50) may adjust the locations of the multiple crosshairs 10 with reference to the reference point.

In other words, the reference point 11 may be designated as a user desires and may replace the center point.

For example, as shown in FIG. 12, a point or pixel on the screen 100 may be designated as the reference point 11.

Alternatively, as shown FIGS. 13 to 15, any of the crosshairs 10 may be designated as the reference point 11.

This is to make targeting easier depending on a user's strategy.

Figure 8:
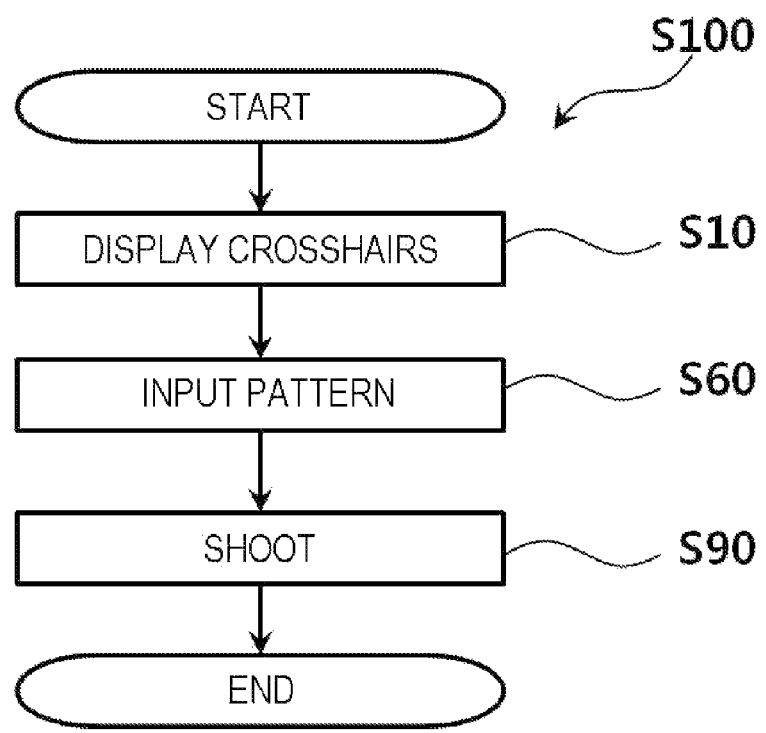

As shown in FIG. 8, the method of applying multiple crosshairs according to the embodiment (S100) may include, after the displaying of the crosshairs (S10), inputting a pattern of crosshairs according to successive shootings (S60).

In video shooting games, to make it more realistic, if a crosshair is moved due to recoil of a weapon upon firing, a value of the recoil may be input as a pattern. In other words, a stance for attack (shooting) may be set. Further, in a case of a recoilless, future weapon, a pattern of successive shooting may be input. Here, if successive shooting is done, it may be returned to an initially set location of a crosshair.

For example, as shown in FIG. 16, assuming that a person attacks with two weapons 20 one in each hand, due to the value of recoil by a successive shooting, the crosshairs may be widen toward side ends.

When a character shoots while moving, he may not shoot in a right stance. Accordingly, by setting variously, the game becomes more attractive.

For example, by inputting a pattern in which a user shoots in succession with his right hand moving clockwise, and a pattern in which the user shoots in succession with his left hand moving counterclockwise, it is easier to aim at a character moving to the right while jumping by shooting in succession with the right hand, and it is easier to target a character moving to the left while jumping by shooting in succession with the left hand. Accordingly, it is possible to use various strategies, and thus attracting users.

Figure 9:
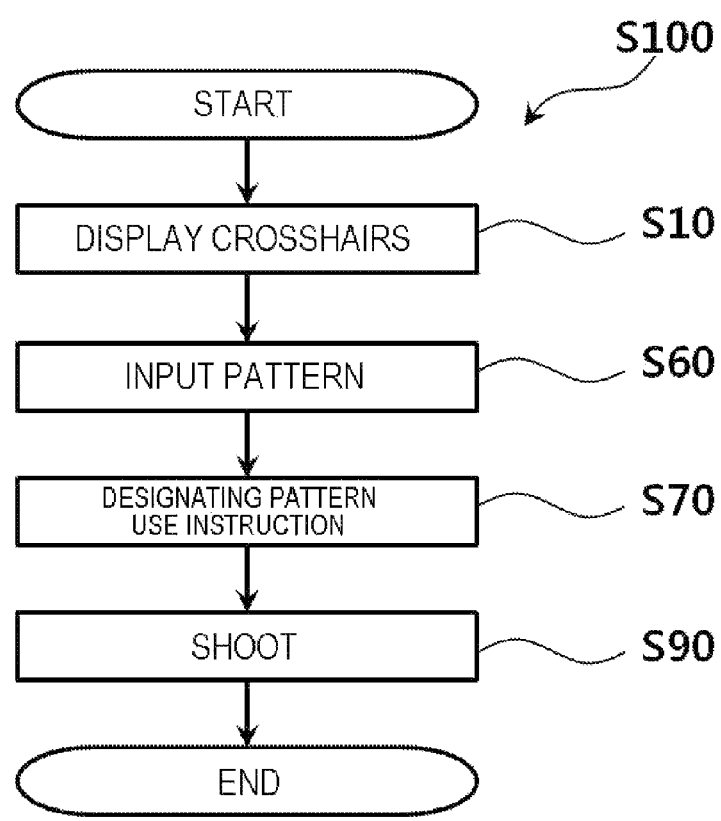

As shown in FIG. 9, the method of applying multiple crosshairs according to the embodiment (S100) may include, after the inputting of the pattern (S60), designating a pattern use instruction to use a pattern input in the inputting of the pattern S60 (S70).

In other words, the pattern use instruction may be designated as a user desires.

For example, when various patterns are input, each of the pattern use instructions may be designated using a keyboard, a mouse, a joystick, a touchpad, a touch screen or the like.

Figure 10:
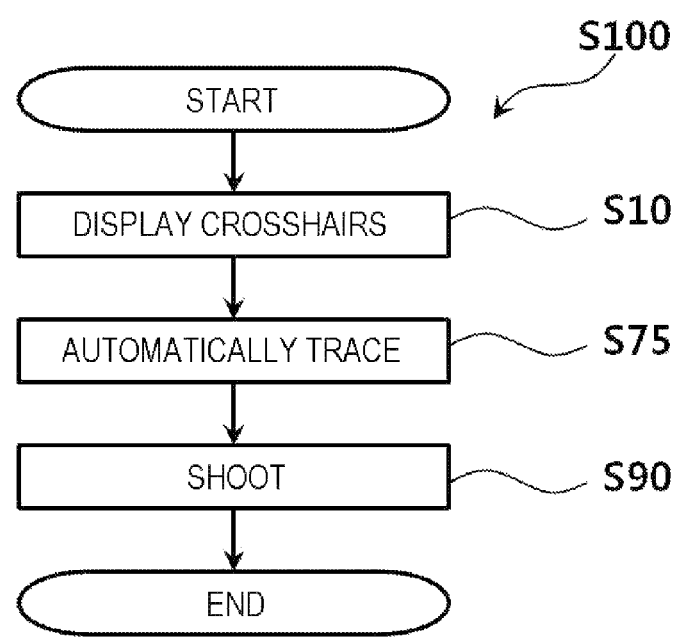

As shown in FIG. 10, the method of applying multiple crosshairs according to the embodiment (S100) may include, before the shooting (S90), automatically tracing the target 30 by the crosshairs 10 if the target 30 passes over the crosshairs 10 (S75).

For example, in a case of a future weapon in which a crosshair automatically traces a target, from when the crosshair 10 is placed on the target 30, the crosshair 10 may automatically trace the target 30.

Thus far, the method of applying a multiple crosshairs according to the embodiments of the present invention has been described. As will be easily appreciated by those skilled in the art, the method may be included in a recording medium (for example, a hard disk, a CD-ROM, a USB memory and the like) readable by a computer in which programs to execute the method are tangibly implemented.

According the method of applying multiple crosshairs and a recording medium having stored thereon a program for executing the method according to the embodiments of the present invention, the number of crosshairs displayed on a screen corresponds to the number of weapons to be equipped, making a game realistic.

In addition, using multiple crosshairs enables a user to aim at a target more easily, and thus the entry barrier to the game is lowered, enticing new subscribers.

Moreover, using multiple crosshairs enables a user to aim at a target more easily and thus the user feel less fatigue.

Additionally, since a user can respond quickly by using multiple crosshairs, a speedy game progress is possible, thereby providing excitement and entertainment.

Further, various types of shooting instructions can be implemented depending on a user's preference, such that various strategies are possible, thereby attracting users.

In addition, the number of projectiles is reduced by the number of simultaneously launched projectiles, making the game more realistic.

Further, the number of crosshairs can be adjusted depending on a user's preference, such that various strategies are possible, thereby attracting users.

Further, the locations of crosshairs can be designated depending on a user's preference, such that various strategies are possible, thereby attracting users.

Further, the locations of crosshairs can be adjusted depending on a user's preference, such that various strategies are possible, thereby attracting users.

Further, various types of location adjust instructions can be implemented depending on a user's preference, such that various strategies are possible, thereby attracting users.

Further, the location of a reference point can be adjusted depending on a user's preference, such that various strategies are possible, thereby attracting users.

Further, a pattern (stance) according to successive shooting can be implemented depending on a user's preference, such that various strategies are possible, thereby attracting users.

Further, various types of pattern use instructions can be implemented depending on a user's preference, such that various strategies are possible, thereby attracting users.

The life cycle of a game can be elongated by providing excitement due to a speedy game progress and by allowing a user to designate setting depending on his preference.

The present invention is not limited to the above-mentioned exemplary embodiments and may be variously applied. It is obvious that various modifications are possible without departing from the gist of the present invention defined by the claims.

What is claimed is:

1. A method of applying multiple crosshairs in which a background and a target are displayed on a screen by a character's operation and crosshairs are displayed on the screen, the method comprising:
    displaying multiple crosshairs allocated to the character on the screen with at least one processor;
    changing the number of crosshairs by adding or deleting the crosshairs with the at least one processor;
    designating the locations of the crosshairs with the at least one processor;
    upon receiving a predetermined crosshair adjust instruction from an input device, adjusting locations of the crosshairs by adjusting the distances among the crosshairs with the at least one processor; and
    upon receiving a shooting instruction, shooting projectiles toward the crosshairs with the at least one processor,
    wherein in the shooting, shooting of the projectiles is allowed for all of the crosshairs simultaneously when all of the crosshairs are added, and
    shooting of the projectiles at added multiple crosshairs simultaneously when multiple crosshairs, but not all crosshairs, are selected.

2. The method of claim 1, further comprising, before the shooting, designating a shooting instruction to shoot toward one crosshair or two or more crosshairs, wherein the shooting is conducted according to the shooting instruction designated in the designating of the shooting instruction.

3. The method of claim 1, wherein in the shooting, the number of the projectiles is reduced by the number of the launched projectiles.

4. The method of claim 1, further comprising, before the adjusting of the locations of the crosshairs, designating the crosshair adjust instruction.

5. The method of claim 1, further comprising, before the adjusting of the locations of the crosshairs, designating a location of a reference point, wherein the locations of the crosshairs adjust with reference to the reference point.

6. The method of claim 1, further comprising, after the displaying of the crosshairs, inputting a pattern of crosshairs according to successive shooting.

7. The method of claim 6, further comprising, after the inputting of the pattern, designating a pattern use instruction to use a pattern input in the inputting of the pattern.

8. The method of claim 1, further comprising, before the shooting, automatically tracing the target by the crosshairs if the target passes over the crosshairs.

9. A non-transitory computer-readable recording medium having stored thereon a program for executing the method comprising:

displaying multiple crosshairs allocated to a character on a screen in a video game environment with at least one processor, wherein the video game environment comprises a background and a target;

changing the number of crosshairs by adding or deleting the crosshairs with the at least one processor;

designating the locations of the crosshairs with the at least one processor;

upon receiving a predetermined crosshair adjust instruction from an input device, adjusting locations of the crosshairs by adjusting the distances among the crosshairs with the at least one processor; and upon receiving a shooting instruction, shooting projectiles toward the crosshairs with the at least one processor;

wherein in the shooting, shooting of the projectiles is allowed for all of the crosshairs simultaneously when all of the crosshairs are added, and shooting of the projectiles at added multiple crosshairs simultaneously when multiple crosshairs, but not all crosshairs, are selected.

10. The non-transitory computer-readable recording medium of claim 9, wherein the method further comprises: before the shooting, designating the shooting instruction to shoot toward one crosshair or two or more crosshairs of the multiple crosshairs, wherein the shooting is conducted according to the shooting instruction.

11. The non-transitory computer-readable recording medium of claim 9, wherein the method further comprises: after the displaying of the multiple crosshairs, inputting a pattern of crosshairs according to successive shooting.

* * * * *